United States Patent [19]

Gibson

[11] Patent Number: 4,686,008
[45] Date of Patent: Aug. 11, 1987

[54] PYROLYTIC DECOMPOSITION APPARATUS

[76] Inventor: Harry T. Gibson, P.O. Box 122, Thurmont, Md. 21788

[21] Appl. No.: 785,394

[22] Filed: Oct. 8, 1985

[51] Int. Cl.⁴ ............................................. C10B 7/10
[52] U.S. Cl. .................................... 202/118; 201/33; 202/265; 585/241
[58] Field of Search ............... 202/118, 117, 262, 265, 202/97; 201/3, 8, 2.5, 32, 33, 40, 25; 48/111, 209; 422/229, 204, 205; 414/197; 432/139, 164, 171, 107, 110; 110/242, 258; 100/117; 366/322, 323; 585/241; 34/183

[56] References Cited

U.S. PATENT DOCUMENTS

| 1,573,824 | 2/1926 | Griffiths | 201/12 |
| 2,466,492 | 4/1949 | Sizer | 110/150 |
| 2,973,306 | 2/1961 | Chick et al. | 201/33 |
| 2,975,096 | 3/1961 | Ginaven et al. | 100/117 |
| 3,787,292 | 1/1974 | Keappler | 202/118 |
| 4,084,521 | 4/1978 | Herbold et al. | 110/242 |
| 4,193,696 | 3/1980 | Van Heel et al. | 366/322 |
| 4,235,676 | 11/1980 | Chambers | 202/118 |
| 4,308,103 | 12/1981 | Rotter | 202/117 |
| 4,412,889 | 11/1983 | Oeck | 202/117 |
| 4,446,788 | 5/1984 | Molnar | 100/117 |

FOREIGN PATENT DOCUMENTS 138213  4/1985  European Pat. Off. ............. 201/32

Primary Examiner—Barry S. Richman
Assistant Examiner—Joye L. Woodard
Attorney, Agent, or Firm—Dennis P. Clarke

[57] ABSTRACT

Apparatus is disclosed for the thermal decomposition or pyrolysis of shredded vehicle tires. Interially of a pyrolysis chamber is mounted a hollow shaft which carries on at least a portion of its outer surface, a conveyor flight and a plurality of partial flights which compact, mix and stir the rubber shreds during the decomposing cycle. Undecomposed rubber, fiberglass, carbon and metal products are collected at the end of the decomposition chamber and the gaseous products of decomposition are separately collected and sent through a fractionator. Externally of the decomposition chamber is a screen type magnetic separator which removes the magnetic susceptible metal particles and the carbon passes through the rotating cylindrical screen. Undecomposed rubber, fiberglass and the like are removed from the screen and separately treated.

7 Claims, 4 Drawing Figures

PYROLYTIC DECOMPOSITION APPARATUS

THE INVENTION

This invention relates to an improved apparatus for pyrolytic decomposition of vehicle tires.

It is a primary object of the present invention to provide a compact system for converting shredded vehicle tires into solid particles such as carbon, metal, fiberglass and other primarily non-combustible materials and gaseous constituents which may be cooled and fractionated into useful components.

It is a further object to provide such a device that is suitably compact to be transported on a trailer to sites where used vehicle tires are collected and stored thereby reducing handling cost of pyrolytic decomposition of shredded vehicle tires to a minimum.

BRIEF SUMMARY OF THE INVENTION

Apparatus for carrying out the pyrolytic decomposition of vehicle tires includes an elongated pyrolysis chamber having mounted therein a hollow shaft which is rotated on a horizontal axis. Means are provided at one end of the pyrolysis chamber for rotating the shaft and means are provided at the opposite end for heating the external and internal surface of the rotating shaft. The zone of the pyrolysis chamber occupied by the rotatable hollow horizontal shaft is divided into a plurality of sub-zones, the first of which comprises an inlet chamber for shredded vehicle tires and means for conveying the shredded materials toward the opposite end of the chamber as the hollow shaft is rotated. The second sub-zone is a zone without conveying means carried by the hollow rotatable shaft and the second sub-zone is followed by a third sub-zone wherein the compacted and partially decomposed shredded vehicle tires are further compacted, stirred and conveyed by partial conveyor means carried by the hollow shaft to a discharge end for non-decomposed and partially decomposed rubber and foreign material such as metallic strands, fiberglass and carbon. The gaseous products of decomposition are withdrawn via a plurality of outlet pipes and conveyed to fractionating means. The partially decomposed rubber is returned to the inlet of the decomposition chamber; the carbon is collected for sale to industry and the fiberglass and metal scraps are disposed of in a suitable manner.

DESCRIPTION OF THE PREFERRED EMBODIMENTS OF THE INVENTION

Figure 1:
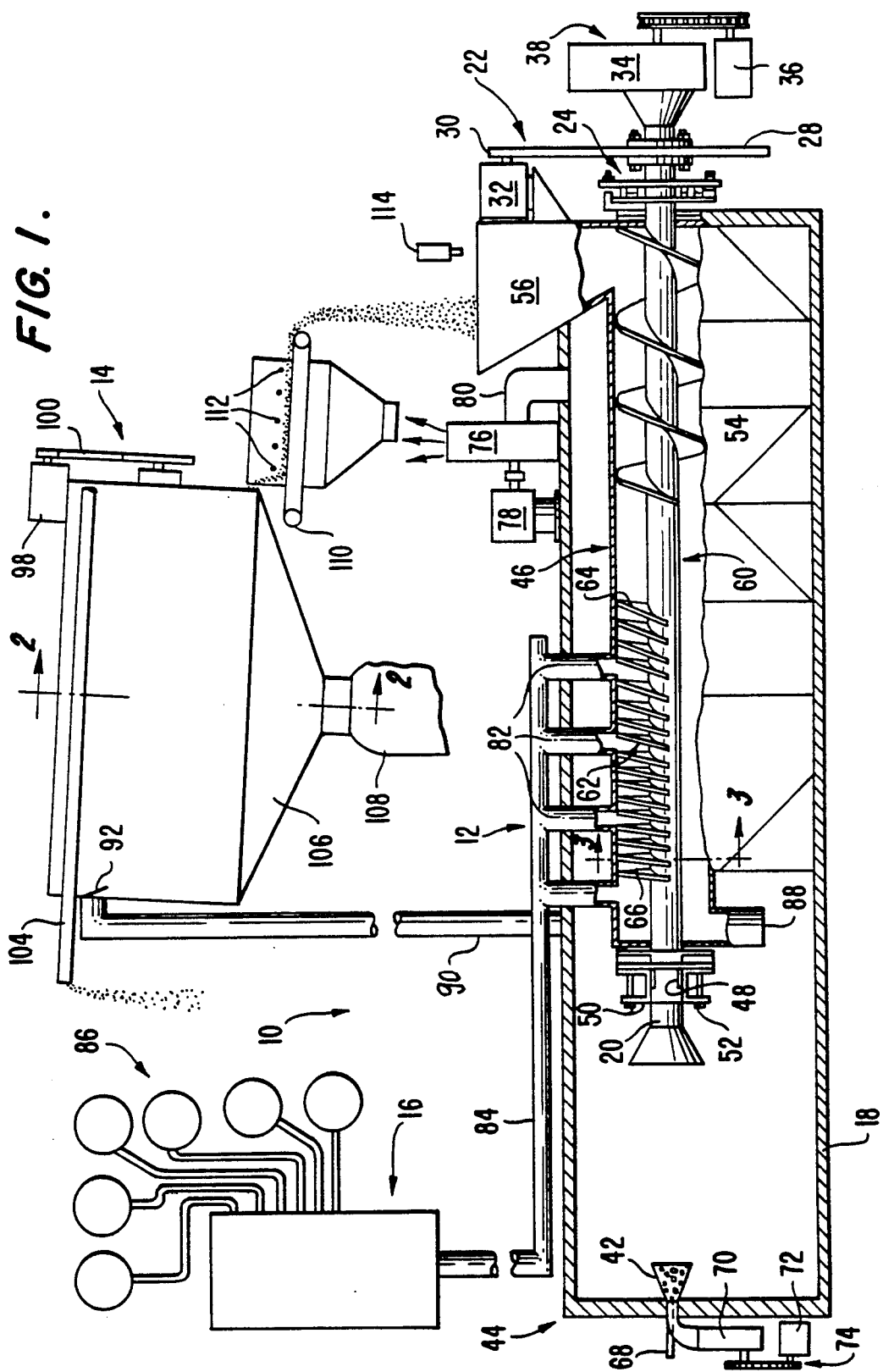
FIG. 1 is a diagramatic view in partial section of apparatus for carrying out the method of the invention.

Referring to the drawing, 10 generally designates the apparatus of the invention which includes the pyrolysis chamber 12, the solid particle separator 14, and the fractionating device 16. The pyrolysis chamber 12 comprises an elongated chamber 18 which may be formed of firebrick or the like non-combustible material. In a preferred embodiment the chamber 18 has a diameter of 32" and a length of 30'. Rotatably mounted within the chamber 46 is a hollow shaft 20 which for the above dimensioned chamber 18 has a length of about 22 feet and an external diameter of 6".

The shaft 20 is mounted at end 22 of the chamber 46 in a seal and bearing structure 24. The shaft support and thrust bearing 24 includes pressure plates 26. Outboard of the thrust bearing 24 is mounted a large gear or trunion 28 which is driven by pinion 30 via electric motor and gear box 32.

Connected outboard of the drive gear 28 is an induced draft fan 34 driven by a second electric motor 36 via pulleys and belt drive generally designated 38.

At the opposite end of the shaft 20 is a second support bearing carried from the internal wall of the chamber 18 by spider means not shown. The bearing means are equipped with heat resistant bearing materials in view of the heat generated by a burner 42 at the end 44 of the chamber 18.

Spaced about the hollow rotating shaft 20 is a shell 46 forming the decomposition chamber per se. In order to isolate the decomposition chamber 46 from ambient atmosphere and to prevent the escape of gases of decomposition a shaft seal 48 is mounted outboard of the inner support bearing. Means generally designated 50 are associated with the shaft seal 48 which provides means for tightening the gland nut 52 outside of the refractory wall of the chamber 18 while the unit is in operation. Because the metal of the rotating hollow shaft 20 tends to gall under the seal packing 48 the surface may take the form of an application of titanium nitride or one of the other metallic nitrides or one of the metallic carbides depending upon the temperature at which the unit is intended to operate. Other forms of non-galling materials may be employed such as providing the shaft at the seal with a ceramic coating.

At the input end of the hollow rotatably shaft 20 is a first screw flight 54 which extends from an input hopper 56 approximately one-fifth the length of the shell 46 which flight surrounds the rotating shaft and is welded thereto. In a transverse direction, the flight extends from the outer surface of shaft 20 to the inner surface of shell 46. Following the end 58 of screw or conveyor flight 54 is a zone 60 which is flightless and has a length along the shaft 20 slightly less than the length of screw flight 54, for example, 2.5 feet. While the second zone is flightless, it is very important as the only way the tire segments can get through the second zone is to be pushed by rubber pieces from the first zone containing the auger flight. In so doing, the rubber pieces pack making a very dense plug of rubber pieces throughout the second zone which firstly presses the air out from between the rubber pieces and secondly keeps the gas from the decomposition chamber from escaping through the hopper of rubber pieces.

It will be appreciated that this formed plug sticks so tightly that the need for spraying the rubber strips with oil as to be more fully described hereinafter reduces the power requirements of the auger in the first zone. This oil also assists in break up of the plug when it reaches the third zone having the partial flights.

Figure 3:
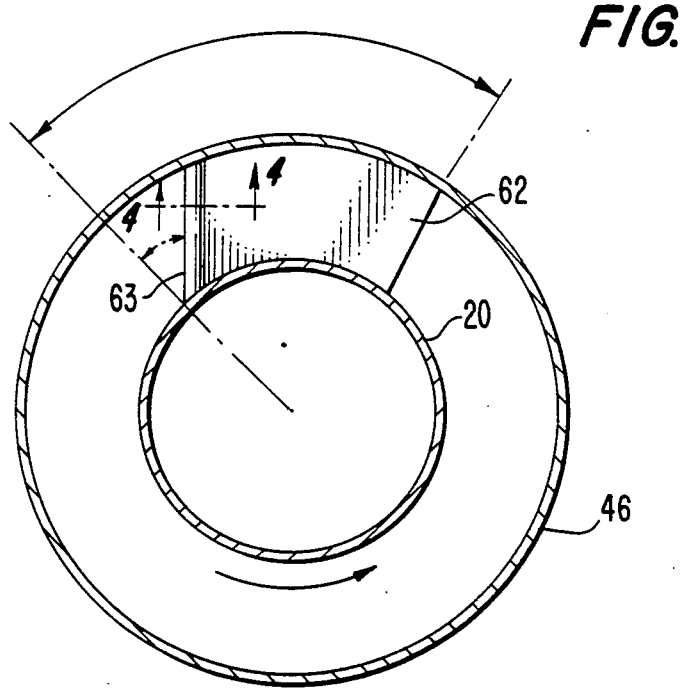
FIG. 3 is a section on line 3—3 of FIG. 1.
Figure 4:
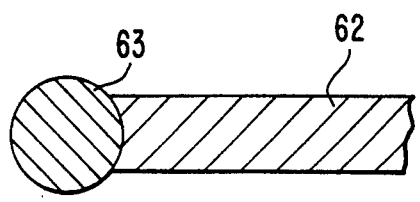
FIG. 4 is a fragmentary section on line 4—4 of FIG. 3.

Following the zone 60 are a plurality of partial flights 62 which by way of example extend approximately two-thirds the length of the shaft 20. It will be particularly noted in respect to the partial flight 62 that the first element thereof 64 has the same pitch or lead as the pitch or lead of flight 54 with the pitch or lead decreasing toward the last of the partial flights 66. It will be particularly noted from FIGS. 1 and 3 that partial flights 62 extend from the outer surface of the hollow shaft 20 to the inner surface of the chamber 46 and that adjacent the line of contact between the partial flights and the rotating shaft 20 the flight covers approximately one-third the circumference of the hollow shaft. The leading edge 63 of each partial flight slopes rearwardly about 45° from the radius and the leading edge 63 is enlarged compared to the thickness of the partial flight and is curvalinear shaped. It has been found that if this edge is not formed properly, it becomes fouled with wire and pieces of gummy rubber and will cut production to about one-quarter of what it should be. The illustrated shape, FIGS. 3 and 4, overcome this difficulty.

The primary function of the partial flight 62 is to mix and stir the partially decomposed rubber composition. By decreasing the lead on the partial flights accomodates the loss involved due to decomposition and permits the rubber to have an increased exposure time in the decomposition chamber without lengthening the chamber thereby permitting an increased output for a fixed length of chamber.

As herein before stated, at end wall 44 of the refractory housing is a burner 42 provided with fuel via pipe 68 and draft via fan 70 driven by electric motor 72 and belt drive generally designated 74.

A portion of the combustion products flow through the hollow shaft 20 and a portion about the outer surface of the decomposition chamber or shell 46. The flow of hot combustion gases is ensured by fan 34 for the hollow shaft 20 and fan 76 driven by motor 78 connected to the upper surface of the refractory chamber via pipe 80. The cooler combustion gases are illustrated as exhaust into the atmosphere.

The gaseous products of decomposition exit the decomposition shell 46 via the four illustrated outlet pipes 82 which are connected to a primary duct 84 which conveys the decomposition gaseous products to the fractionating device 16 having a plurality of outlets to a plurality of storage containers for different fractions of the condensed gases generally designated 86. The fractionating device 16 is of commercial form and suitable unit is model number PFS-938-R15 manufactured by the W. W. Konam Company.

Figure 2:
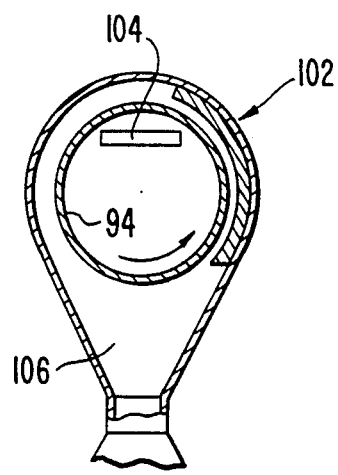
FIG. 2 is a section substantially on line 2—2 of FIG. 1.

At the extreme downstream end of the pyrolysis chamber 46 is a chamber 88 into which is deposited the solid residue of the decomposition process such as undecomposed rubber, metal, fiberglass, and the like. Chamber 88 is connected to a conveyor which runs within the closed conveyor pipe 90 having a discharged end with a hinged gate 92 which communicates with the interior of the classifier 14. As more clearly shown in FIG. 2, within the classifier is a cylindrical screen 94 rotated via shaft 96, electric motor 98 and belt and pulley drive 100. In an upper sector of the classifier 14 are affixed a band of permanent magnets 102 which causes the magnetic susceptible metal particles to be pulled into the wall of the rotating screen 94 to be dumped on the top flight of a conveyor belt 104 which conveys the particles of magnetic susceptible material externally of the classifier. The metal particles may then be cleaned and sold for reuse as the composition of the metal is proper for construction of new tires. Fine carbon falls through the pores in the rotating screen into hopper 106 and into collection bags 108 to be sold to carbon desiring industries. Non-metallic trash and undecomposed rubber is deposited on a conveyor 110 and while on the conveyor the material is subjected to a plurality of air jets connected to a suitable source of pressurized air not shown. The air jets blow the fiber glass off the conveyor into appropriately shaped ducting not shown where it is directed to containers to be used in, for example, laying up the epoxy and polyester castings. The undecomposed rubber is conveyed to the top of the hopper 56 where it is added to shredded rubber to pass again through the decomposition chamber. The much smaller, partially decomposed rubber is very useful as it fills the interstices about the shredded rubber and assists in preventing air from entering the decomposition chamber.

Mounted above the trough or funnel 56 is an oil jet fed with oil under pressure by pumping means not shown. Since the composition of the oil sprayed on the shredded rubber is not critical, waste oil may be used for this purpose. Within the decomposition chamber the oil is broken down by thermal cracking and joins the products of decomposition of the rubber. The oil spray assists in compaction of the shredded rubber and also therefore helps to reduce the power requirements of the compaction flights and assists in maintaining the interior of the decomposition chamber air free.

In addition to, or as a substitute for the closed conveyor 90 from the residue collection box 88 a system of transfer boxes of conventional design may be employed.

In carrying out the present invention, the composition of the rubber tires is not critical and the term rubber as used herein includes natural rubber, synthetic rubbers and mixtures thereof.

In a preferred mode of operation, the decomposition chamber is maintained at a temperature of from about 1000° to about 1400° F.

From the foregoing description it will be seen that useful apparatus and methods have been disclosed and it is recognized that those skilled in the art may make various modifications in the apparatus and process without departing from the scope of the appended claims.

I claim:

1. Apparatus for pyrolytic decomposition of vehicle tires comprising: a horizontally elongated pyrolysis chamber having indirect heating means, a shredded tire feed hopper communicating with the interior of the chamber at an upstream end of the chamber and an outlet means for residue comprising carbon particles, partially decomposed rubber, fiberglass and metallic particles from the chamber at a downstream end of the chamber, a hollow-shaft mounted in said chamber for conveying material therethrough and having one end rotatably extending through a sealed wall at the upstream end of said chamber for rotation on a horizontal axis, and an opposite end rotatably extending through a sealed end wall at the downstream end of the chamber; means for rotating the shaft mounted externally of the chamber at the upstream end; said hollow shaft comprised of three sections, a first section, a second section downstream of the first section and a third section downstream of the second section, a continuous screw flight mounted on the shaft in the first section, said second section being flightless and a plurality of partial screw flights mounted on the shaft in the third section; said continuous screw flight having a constant pitch and extending along the hollow shaft in the first section from below the feed hopper at the upstream end of the chamber for a length about 1/5 the length of the hollow shaft; said plurality of partial screw flights having upstream flights with the same pitch as the pitch of the first continuous screw flight and downstream flights having progressively less pitch in a downstream direction; said partial screw flights terminating upstream of the opposite end of the hollow shaft at the downstream end of the chamber; and means for withdrawing gaseous pyrolysis products from the chamber and directing said gaseous products to a fractionating device.

2. The apparatus as defined in claim 1 further including a refractory housing spaced about the pyrolysis chamber; said indirect heating means including means for directing products of combustion into the refractory chamber to flow about the pyrolysis chamber and through the opposite end of the hollow shaft.

3. The apparatus as defined in claim 2 wherein the means for directing the hot products of combustion through the hollow shaft comprises fan means mounted at the one end of the hollow shaft and the means for directing hot products of combustion about the pyrolysis chamber comprises further fan means communicating with the space between the pyrolysis chamber and the refractory chamber.

4. The apparatus as defined in claim 3 wherein the outlet means for the residue from the pyrolysis chamber is connected to a separator, said separator including a rotatable screen and permanent magnents mounted within said screen which separate the metallic particles from the residue; said screen separating carbon particles from the fiberglass and partially decomposed rubber, and means for discharging said fiberglass and partially decomposed rubber from the separator.

5. The apparatus as defined in claim 4 wherein means are provided for subjecting the fiberglass and partially decomposed rubber discharged from the separator to a compressed stream of air to remove the fiberglass from the partially decomposed rubber and means for directing the partially decomposed rubber to the shredded tire feed hopper.

6. The apparatus as defined in claim 5 wherein a closed conveyor connects the outlet means for the residue from the pyrolysis chamber with the separator to prevent entry of ambient atmosphere into the pyrolysis chamber.

7. The apparatus as defined in claim 1 wherein oil spray means are mounted in communication with the shredded rubber feed hopper to assist in compaction of the shredded rubber in the pyrolysis chamber.

* * * * *